(12) United States Patent
Bratel

(10) Patent No.: US 8,393,926 B2
(45) Date of Patent: Mar. 12, 2013

(54) HYBRID MARINE POWER TRAIN SYSTEM

(75) Inventor: Dean J. Bratel, New Berlin, WI (US)

(73) Assignee: Twin Disc, Inc., Racine, WI (US)

( * ) Notice: Subject to any disclaimer, the term of this patent is extended or adjusted under 35 U.S.C. 154(b) by 215 days.

(21) Appl. No.: 12/474,917

(22) Filed: May 29, 2009

(65) Prior Publication Data
US 2010/0203777 A1 Aug. 12, 2010

Related U.S. Application Data

(60) Provisional application No. 61/152,061, filed on Feb. 12, 2009.

(51) Int. Cl.
*B63H 20/14* (2006.01)
(52) U.S. Cl. ......................................................... 440/75
(58) Field of Classification Search ...................... 440/75
See application file for complete search history.

(56) References Cited

U.S. PATENT DOCUMENTS

| | | | |
|---|---|---|---|
| 2,685,858 A * | 8/1954 | Harrison, Jr. | 114/332 |
| 3,601,989 A * | 8/1971 | Austin | 60/221 |
| 3,703,642 A | 11/1972 | Balaguer | |
| 3,812,379 A | 5/1974 | Kaufman et al. | |
| 3,826,218 A | 7/1974 | Hiersig et al. | |
| 3,888,325 A * | 6/1975 | Reinbeck | 180/65.25 |
| 4,403,968 A | 9/1983 | Heidrich et al. | |
| 4,417,878 A | 11/1983 | Koren | |
| 4,568,289 A | 2/1986 | Heidrich et al. | |
| 5,040,648 A * | 8/1991 | Mitchell et al. | 192/3.58 |
| 5,616,056 A | 4/1997 | Meissner | |
| 5,863,228 A | 1/1999 | Tether | |
| 6,033,271 A | 3/2000 | Schafer | |
| 6,062,921 A | 5/2000 | Mock et al. | |
| 6,378,681 B1 | 4/2002 | Themsen | |
| 6,443,286 B1 | 9/2002 | Bratel et al. | |
| 6,666,312 B2 | 12/2003 | Matranga et al. | |
| 6,978,617 B2 | 12/2005 | Goldmeer et al. | |
| 7,147,523 B2 | 12/2006 | Mori et al. | |
| 7,207,852 B2 | 4/2007 | Myers | |
| 7,241,192 B2 | 7/2007 | Andersen et al. | |
| 7,300,322 B2 | 11/2007 | Kitani et al. | |
| 7,353,764 B2 | 4/2008 | Rzadki et al. | |
| 7,381,107 B2 | 6/2008 | Ishikawa et al. | |
| 2002/0032097 A1 * | 3/2002 | Koelle et al. | 477/3 |
| 2004/0192123 A1 | 9/2004 | Mori et al. | |
| 2005/0106953 A1 | 5/2005 | Andersen et al. | |
| 2006/0006039 A1 * | 1/2006 | Hoebel et al. | 192/70.11 |

* cited by examiner

*Primary Examiner* — Stephen Avila
(74) *Attorney, Agent, or Firm* — Boyle Frederickson S.C.

(57) ABSTRACT

A hybrid marine power train system is provided that facilitates selective use of one of multiple prime movers for powering and driving a boat. The multiple prime movers can include an internal combustion engine and an electric motor which can itself be part of a motor/generator assembly. The system further includes a power-take-in assembly that can have either an active or passive clutching device for selectively importing power from the prime movers into the transmission. The system is configured so that the second prime mover occupies relatively little space within an engine compartment of the boat, for example when compared to an amount of space occupied by the first prime mover and transmission. Since the second prime mover occupies relatively little space within the engine compartment, the system can be readily retrofitted to existing marine power train systems.

22 Claims, 9 Drawing Sheets

HYBRID MARINE POWER TRAIN SYSTEM

CROSS-REFERENCE TO RELATED APPLICATION

This application claims priority under 35 U.S.C. §119(e) from U.S. Provisional Patent Application Ser. No. 61/152,061, filed on Feb. 12, 2009, the entirety of which is expressly incorporated by reference herein.

BACKGROUND OF THE INVENTION

1. Field of the Invention

The present invention relates generally to marine power trains and more specifically to a hybrid marine power train system that can utilize either an internal combustion engine or electric motor for propelling a boat.

2. Discussion of the Related Art

In light of numerous environmental concerns, hybrid vehicles that can be powered at least at times with electrical power instead of relying solely on internal combustion engines are becoming increasingly popular. To date, the most prevalent commercialized examples of this trend are found in the automobile industry.

Some efforts have been made to incorporate hybrid drive technologies into the marine industry. To date, the most prevalent examples have been implemented in only the largest of vessels. For example, various naval vessels incorporate gas turbine engines that drive electrical generators so that the vessels are then solely powered by electrical power from the generators and not directly by the gas turbine engines themselves. As another example, various other vessels such as large barges and cruise ships incorporate diesel-electric systems. Diesel-electric systems use diesel engines that drive electrical generators so that the barges or ships are then solely powered by electrical power from the generators and not directly by the diesel engines themselves.

Because, typically, marine implemented hybrid systems, gas turbine-electric and diesel-electric systems, rely solely on electrical power for propulsion, the generators and/or motors are relatively large to continuously produce electrical power that is used both for propulsion and also for electrical accessory and other needs of the vessel. The sizes of such gas turbine-electric and diesel-electric systems are too large to be incorporated into most vessels or boats in a practical manner.

Nevertheless, many boats, especially large pleasure boats or other boats, can be operated for extended periods of time. For example, when at or near marinas or other mooring locations, boats are often operated for hours at a time despite traveling relatively short distances. As another example, when traversing a no-wake designated portion of a waterway boat engines can operate for extended periods of time at or near idle positions even though only a fraction of the power produced by the engines would be required to suitably propel the boats at no-wake speeds. These and various other situations can lead to more fuel consumption by internal combustion engines and more emissions from such internal combustion engines than might otherwise be necessary.

It is further noted that in various jurisdictions, anti-idling rules and regulations are being proposed and implemented for boats and other watercraft. Some jurisdictions are proposing and implementing rules and regulations that prohibit the use of internal combustion engines, or establish maximum horsepower ratings for internal combustion engines, for certain portions of their waterways.

The prior systems fail to provide a solution to the problem of fuel overconsumption by and emissions from internal combustion engine powered boats.

Accordingly, there is a need for a hybrid marine power train system that can be incorporated into boats that are smaller than large barges and cruise ships. It would also be beneficial to provide a hybrid marine power train system that allows a user to select whether to propel a boat by way of an internal combustion engine or an electric motor, as desired.

SUMMARY OF THE INVENTION

The present invention provides a hybrid marine power train system that facilitates selective use of one of multiple prime movers for powering and driving a boat. The multiple prime movers can include an internal combustion engine and an electric motor, which can itself be part of a motor/generator assembly. The system further includes a power-take-in assembly that can have either an active or passive clutching device for selectively importing power from the prime movers into the transmission. The system is configured so that the second prime mover occupies relatively little space within an engine compartment of the boat, for example when compared to an amount of space occupied by the first prime mover and transmission. Since the second prime mover occupies relatively little space within the engine compartment, the system can be readily retrofitted to existing marine power train systems.

In some embodiments, a hybrid marine power train system according to the present invention includes a first prime mover and a transmission having an input shaft and an overrunning clutch operably coupling the transmission input shaft to the first prime mover. The overrunning clutch includes first and second rotatable segments. A second prime mover is configured to selectively drive the input shaft of the transmission such that when the second prime mover drives the transmission input shaft, the first segment of the overrunning clutch rotates faster than the second segment thereof.

In another object of the present invention, the hybrid marine power train system may include a power-take-in shaft spaced from and operably coupled to the transmission input shaft to connect the second prime mover to the transmission input.

In addition, the second prime mover may be directly connected to the transmission input shaft. Further, the second prime mover may include an electric generator.

In another embodiment of the present invention, the hybrid marine power train system includes a transmission having a transmission input shaft for accepting power into the transmission. The hybrid marine power train system according to this embodiment further includes a transmission output shaft for outputting power to a propeller. A modulatable clutch assembly is operably coupled to the transmission input and output shafts such that the power from the input shaft can be variably transferred to the output shaft. A first prime mover is selectively coupled to the transmission input shaft. A second prime mover having a prime mover input shaft is non-selectively coupled to the transmission input shaft such that the prime mover input shaft and transmission input shaft rotate in unison with one another. The transmission input shaft according to the present embodiment must rotate as fast or faster than a rotational speed provided by the first prime mover to allow the second prime mover to drive the transmission input shaft to overrun the first prime mover when a rotational speed attributable to the second prime mover exceeds a rotational speed attributable to the first prime mover. Alternatively, the first input shaft must rotate as fast or faster than a rotational speed provided by the first prime mover to allow the first prime mover to drive the transmission input shaft and correspondingly rotate the prime mover input shaft of the second prime mover when a rotational speed attributable to the first prime mover exceeds a rotational speed attributable to the second prime mover.

In yet another embodiment of the present invention, the hybrid marine power train system according to the present invention includes first and second prime movers having output shafts that can power a boat for movement thereof. A transmission is operably coupled to the output shafts of the first and second prime movers. The transmission includes an input shaft that can be driven by the first prime mover or the second prime mover. The transmission also includes an overrunning clutch coupling the transmission input shaft to the first prime over. The overrunning clutch includes first and second rotatable segments. The first rotatable segment is configured to rotate in unison with the input shaft of the transmission and the second rotatable segment is configured to rotate in unison with the output shaft of the first prime mover. The first rotatable segment of the overrunning clutch can rotate faster than the second rotatable segment of the overrunning clutch such that when the output shaft of the second prime mover rotates faster than the output shaft of the first prime mover the transmission input shaft is driven by the second prime mover.

The hybrid marine power train system according to the present embodiment may include a transmission input shaft for defining a primary clutch shaft assembly. Further, a modulatable clutch assembly may be provided for operably coupling the primary clutch shaft assembly to an output shaft assembly of the transmission.

In another embodiment of the hybrid marine power train system according to the present invention, a transmission having an input shaft for accepting power into the transmission and an output shaft for outputting power to a propeller is provided. The transmission further includes a modulatable clutch assembly operably coupling the transmission input and output shafts such that the power from the input shaft can be variably transferred to the output shaft. A first prime mover and second prime mover are provided for selectively providing power to the transmission input shaft. A power flow path originating from the first prime mover can flow through the transmission input shaft to each of the second prime mover and the transmission output shaft.

The hybrid marine power train system according to the present embodiment may further include a modulatable clutch assembly. The modulatable clutch assembly may be configured for operably coupling the primary clutch shaft assembly to an output shaft assembly of the transmission.

In yet another embodiment of the present invention, hybrid marine power train system includes a first prime mover. A transmission having an input shaft for transmitting power to the transmission and an output shaft for transmitting power to a propeller is also provided. A master clutch assembly is operably coupled to the transmission input shaft and the first prime mover. A second prime mover is operably coupled to the transmission input shaft for rotation in unison therewith. In the present embodiment, engaging the master clutch assembly establishes a power flow path that originates at the first prime mover and flows through the transmission input shaft to both of the second prime mover and the transmission output shaft. Further, disengaging the master clutch assembly establishes a power flow path that originates at the second prime mover and flows through the transmission input shaft to the transmission output shaft without transmitting power to the first prime mover.

In addition, the master clutch assembly of the hybrid marine power train system according to the present invention may include a hydraulically actuated wet clutch assembly or a hydraulically actuated dry clutch assembly.

Accordingly, it is an object of the present invention to provide a hybrid marine power train system that can propel a boat for extended periods of time with an electric motor, if desired. It is another object of the present invention to provide a hybrid marine power train system that can be installed in an engine compartment which is no larger or substantially the same size as a typical engine compartment that houses only a conventional internal combustion engine power train system.

These, and other aspects and objects of the present invention will be better appreciated and understood when considered in conjunction with the following description and the accompanying drawings. It should be understood, however, that the following description while indicating preferred embodiments of the present invention is given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

1. System Overview

Figure 1:
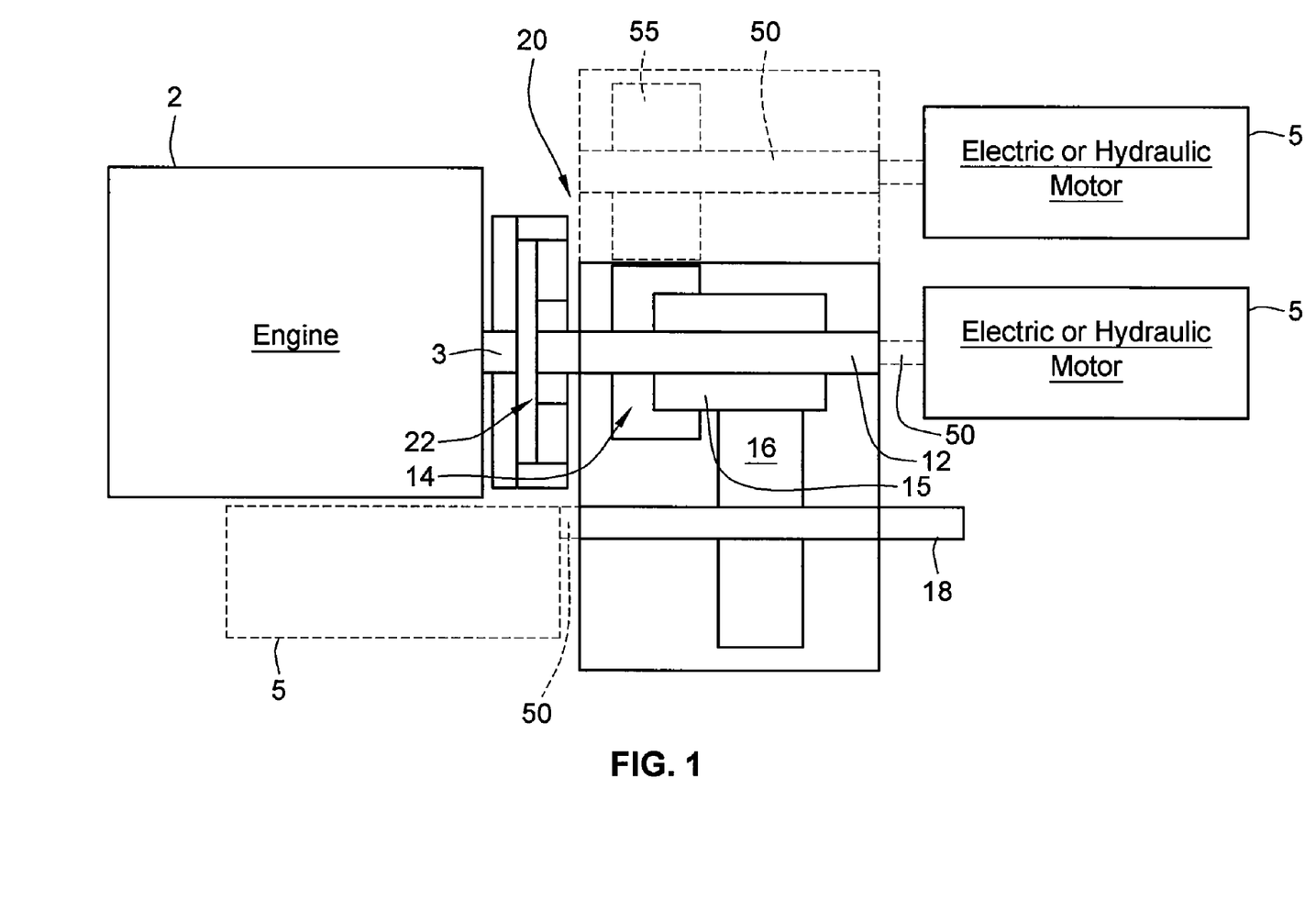
FIG. 1 is a schematic representation of a hybrid marine power train system in accordance with the present invention, showing multiple mounting locations for a motor.
Figure 2:
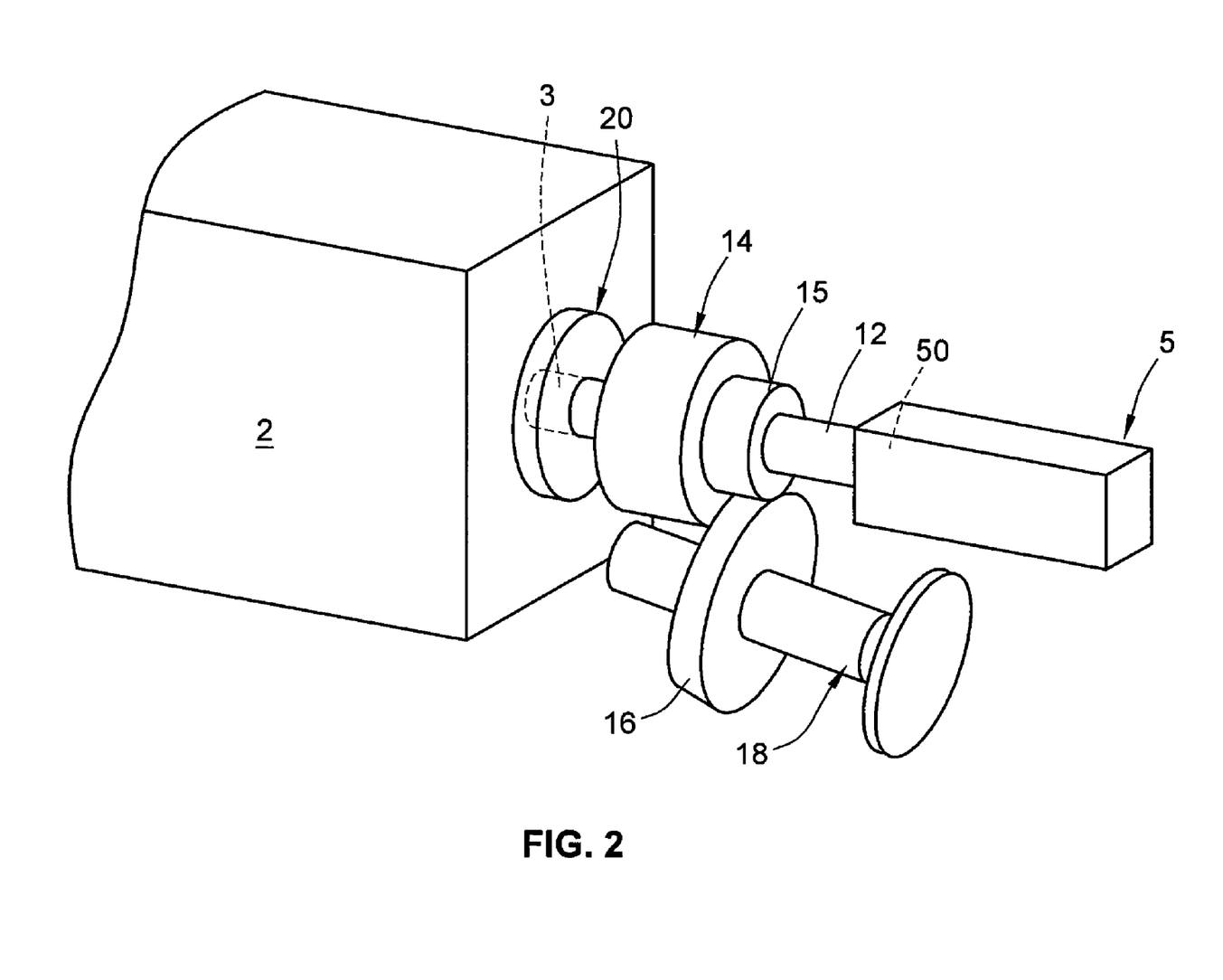
FIG. 2 is a pictorial schematic representation of a hybrid marine power train system in accordance with the present invention with a transmission housing removed.
Figure 3:
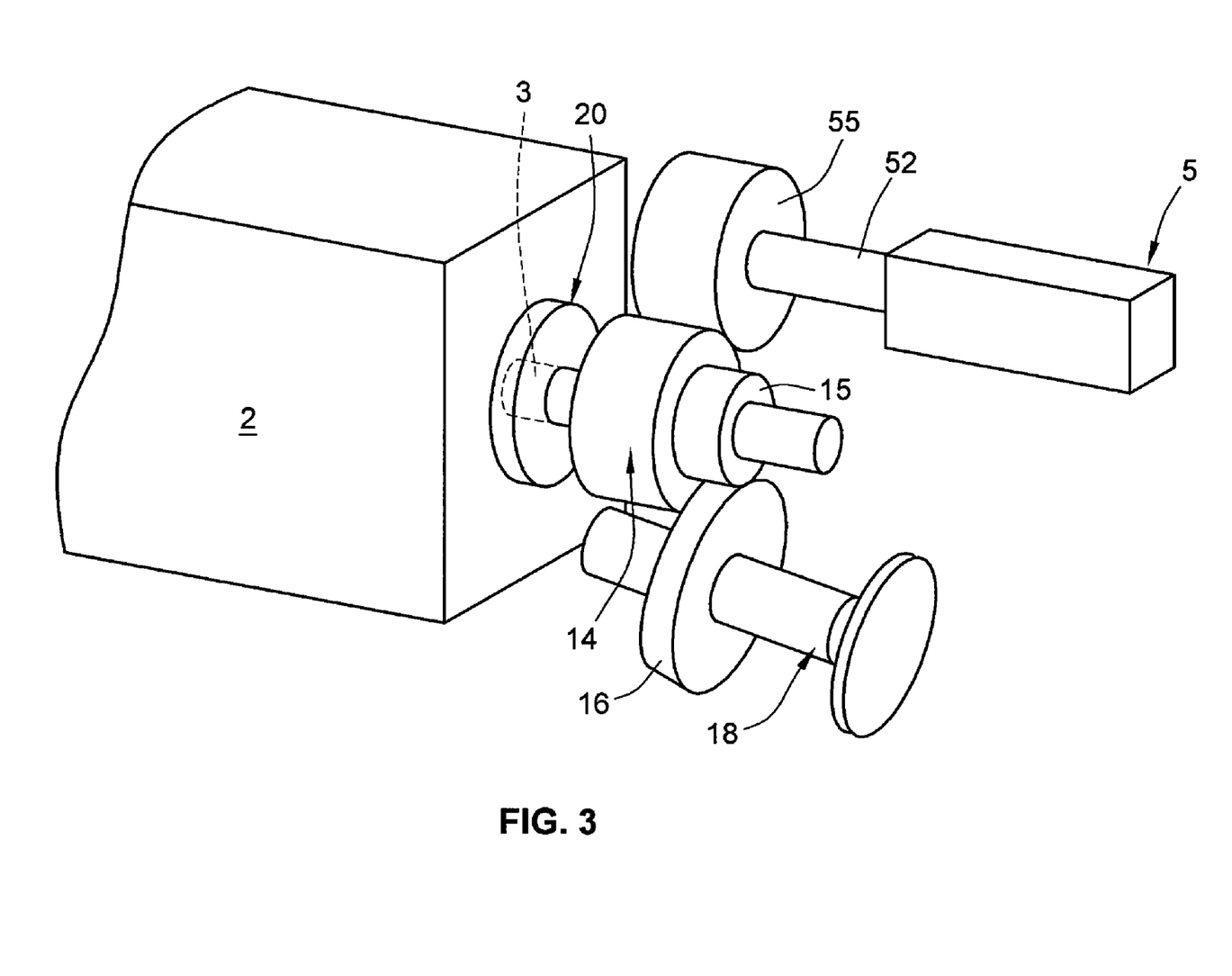
FIG. 3 is a pictorial schematic representation of a variant of the hybrid marine power train system shown in FIG. 2.

With reference now to the drawings, and particularly to FIGS. 1-3, there is shown a cross-sectional schematic view of a hybrid marine power train system 1 that is installed in a boat and allows selective use of any one of multiple prime movers. Exemplary prime movers seen in FIGS. 1-3 are an internal combustion engine such as diesel engine 2, and one or more electric or hydraulic motors such as motor(s) 5. In this configuration, a user can select whether to operate and power or propel the boat with the engine 2 or whether to power and propel the boat electrically (or hydraulically) by way of motor 5 when using engine 2 is not practical, not allowed, or otherwise not desired.

Although engine 2 is labeled as a diesel engine in the drawings, it is noted that engine 2 can include any of a variety of suitable internal combustion engines, including but not limited to various ones of the spark ignition and compression ignition engines types. Furthermore, motor 5 includes any of a variety of suitable electric and/or hydraulic motors and includes a corresponding generator or gen-set, batteries or other electrical storage devices, and controls and/or other accessories for electric motor implementations. For hydraulic motor implementations, motor 5 includes a corresponding hydraulic pump, controls, and/or other accessories.

Still referring to FIGS. 1-3, a marine transmission 10 incorporating a power-take-in (PTI) assembly 20 is operably coupled to each of the prime movers, e.g., each of the engine 2 and motor(s) 5. By way of PTI assembly 20, power is selectively transferred through various different power flow paths through the hybrid marine power train system 1, depending on the desired operational characteristics of the system 1. The different power flow paths through system 1 allow it to function in a variety of ways. System 1 can use engine 2 for propelling the boat, and optionally drive motor 5 and generate electrical power or hydraulic power simultaneously. Or, system 1 can utilize motor 5 for propelling the boat, whether engine 2 is running or shut off. Though mounted as shown, location of the PTI assembly and prime movers can be arranged in a variety of configurations and mounting locations, some of which are described below.

Marine transmission 10 can include a transmission input shaft 12, commonly referred to as a clutch shaft, and a clutch assembly 14 that selectively transmits power from the transmission input shaft 12 to a pinion gear 15. Pinion gear 15 drives an output gear 16 that is mounted to a transmission output shaft 18 which in turn rotates a propeller shaft or other final drive component for propelling the boat. Preferably, clutch assembly 14 is configured to modulate or vary the amount of power transmitted therethrough. Such feature can be found in a marine transmission disclosed in, for example, commonly owned U.S. Pat. Nos. 6,443,286 and 6,666,312, both of which are incorporated by reference herein in their entireties, and are available under the trademark QuickShift® and model series "MGX" from Twin Disc Inc. of Racine Wis.

PTI system 20 includes a PTI clutch device 22 that cooperates with the transmission input shaft, i.e., clutch shaft 12 of the transmission. PTI system 20 further includes a coupling shaft assembly 50 that connects the motor 5 to the transmission 10. In some implementations, shaft assembly 50 can be defined largely or entirely by an output shaft of the motor, whereby the motor 5 can be directly attached to an end of the transmission input shaft 12, the end opposite the engine 2 for embodiments in which the engine 2 and motor 5 sit on opposing sides of the transmission 10.

In some embodiments, the coupling shaft assembly 50 includes a separate and distinct auxiliary shaft 52 that is positioned generally parallel to the transmission input shaft 12. In this configuration, a drive gear 55 can transmit power between the auxiliary shaft 52 (e.g., the fourth shaft) and input shaft 12, either directly of through a clutch basket or other component of clutch assembly 14.

In yet other embodiments, the couple shaft assembly 50 connects motor 5 to the transmission output shaft 18 instead of transmission input shaft 12. This can be done alone or optionally in combination with another motor 5 that is connected to the transmission input shaft 12.

Selecting which of the engine 2 and motor 5 will provide power to the transmission 10 can be accomplished by way of either active procedures or passive procedures, depending on the particular configuration of the PTI clutch device 22. In other words, PTI clutch device 22 can include either an active clutching device or a passive clutching device.

2. Passive Clutch Implementations

Figure 4:
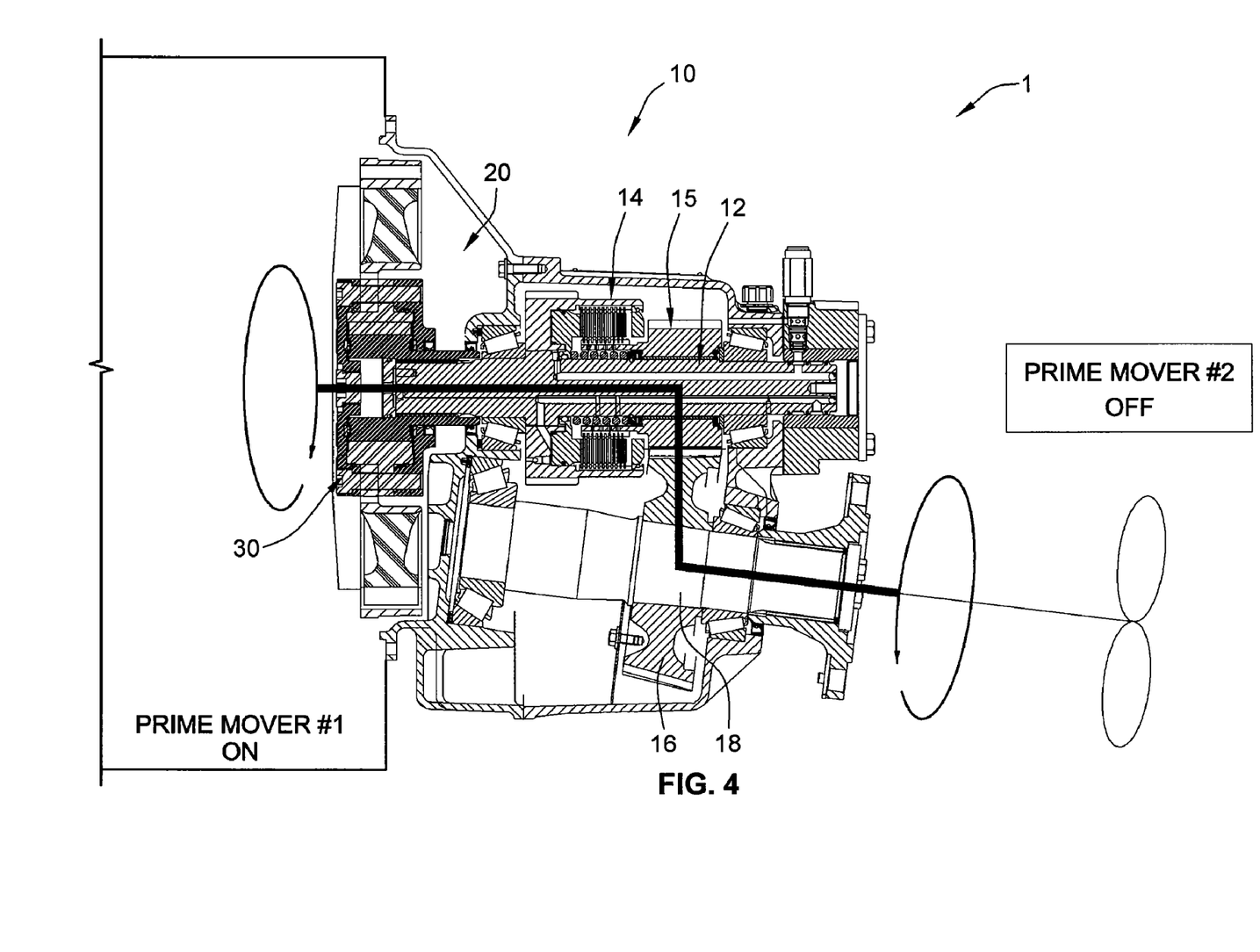
FIG. 4 is a cross-sectional side elevation of a hybrid marine power train system in accordance with the present invention with the transmission inputting power from a first prime mover.
Figure 5:
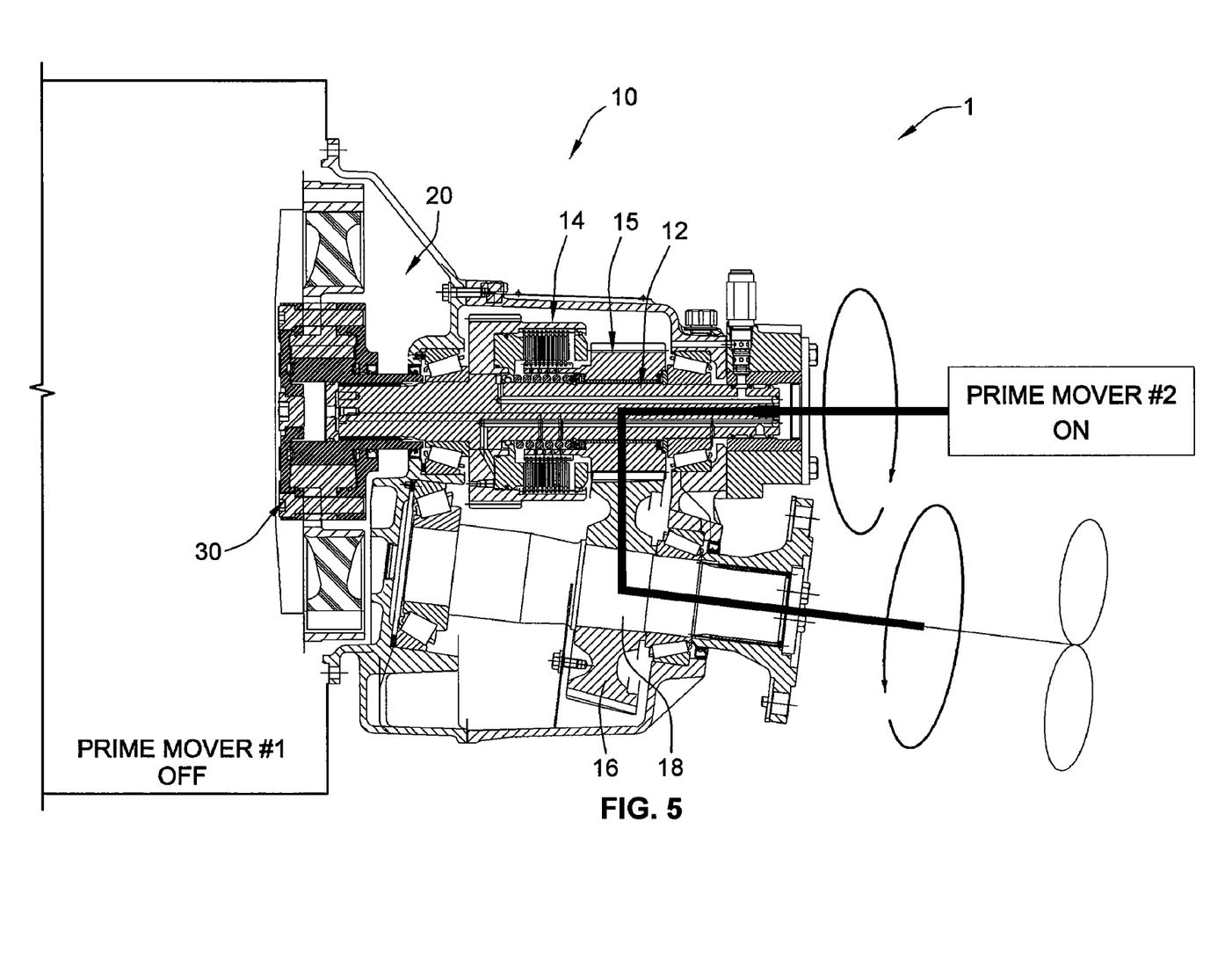
FIG. 5 is a cross-sectional side elevation of the hybrid marine power train system shown in FIG. 4 with the transmission inputting power from a second prime mover.
Figure 6:
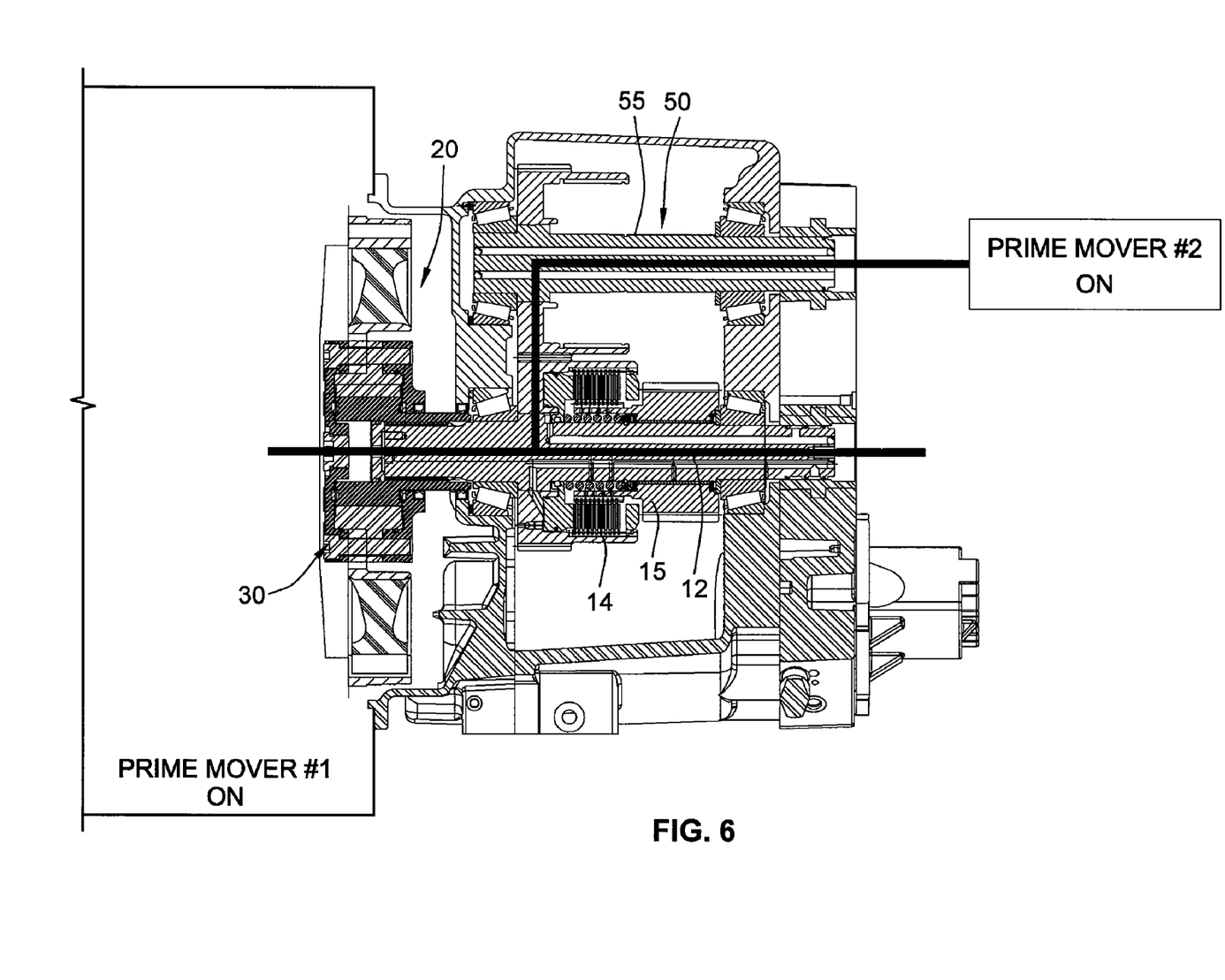
FIG. 6 is a cross-sectional top plan view of a variant of the hybrid marine power train system shown in FIG. 4 with the transmission inputting power from a first prime mover.
Figure 7:
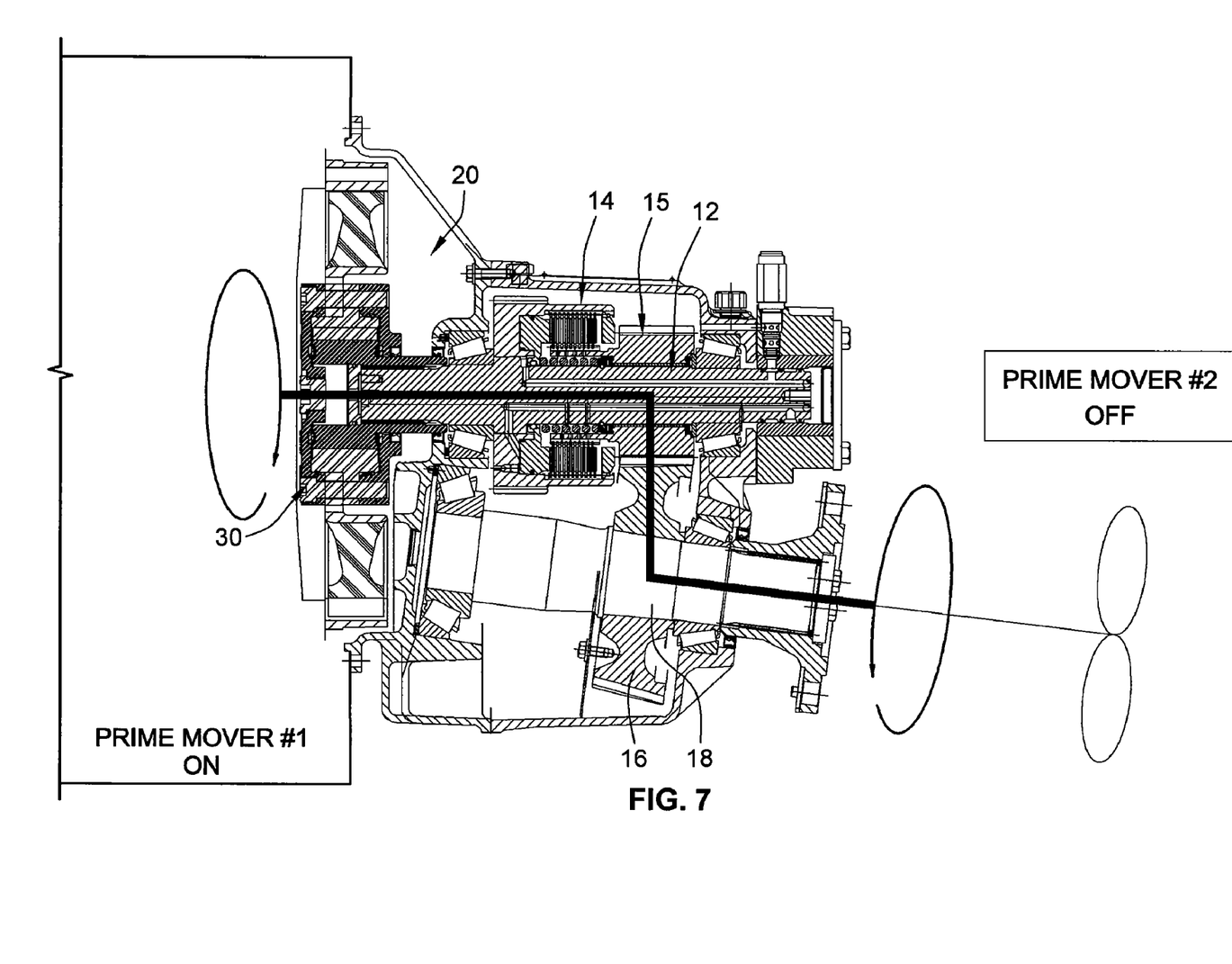
FIG. 7 is a cross-sectional side elevation of the hybrid marine power train system shown in FIG. 6 with the transmission inputting power from a first prime mover.
Figure 8:
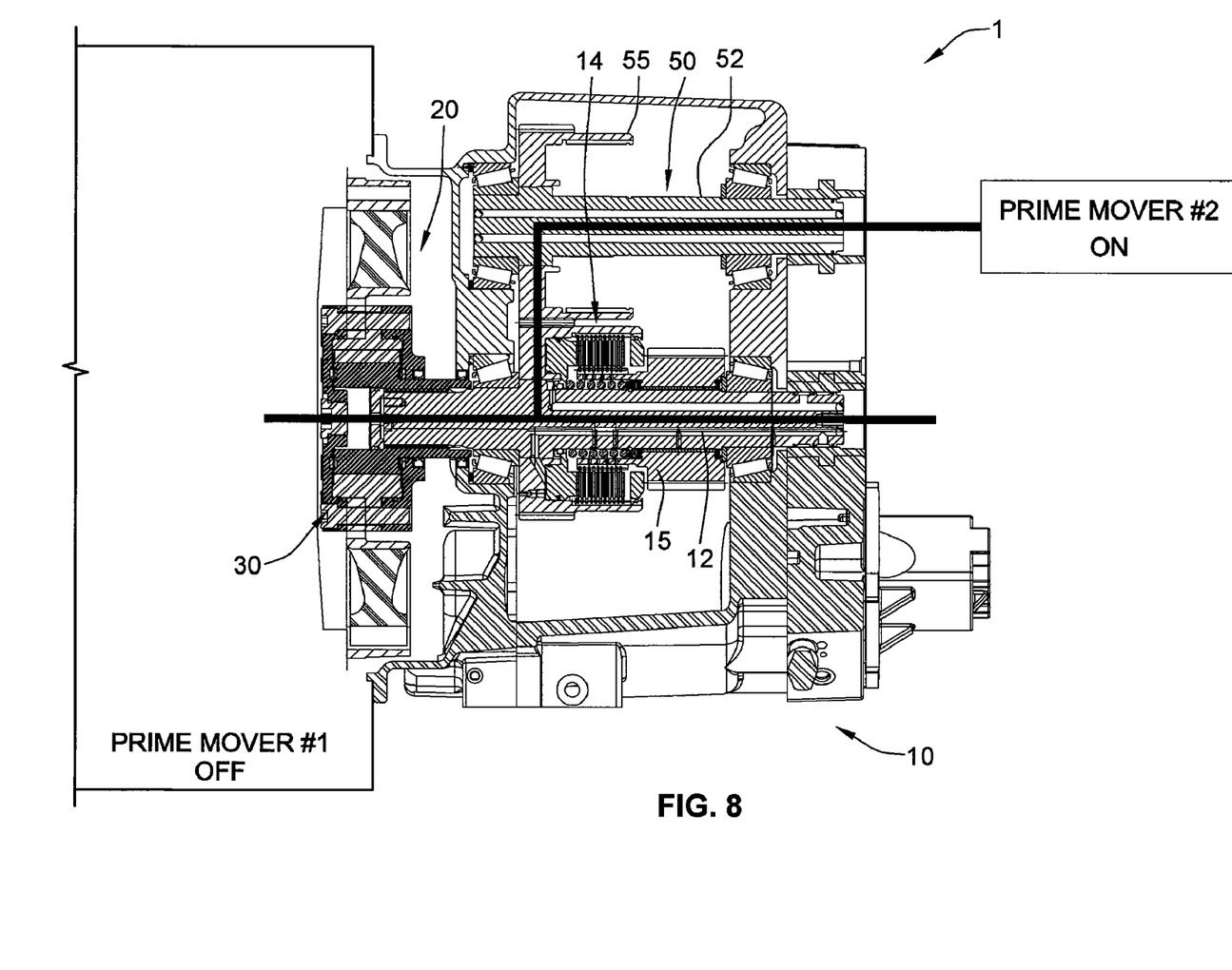
FIG. 8 is a cross-sectional top plan view of the hybrid marine power train system shown in FIG. 6 with the transmission inputting power from a second prime mover.
Figure 9:
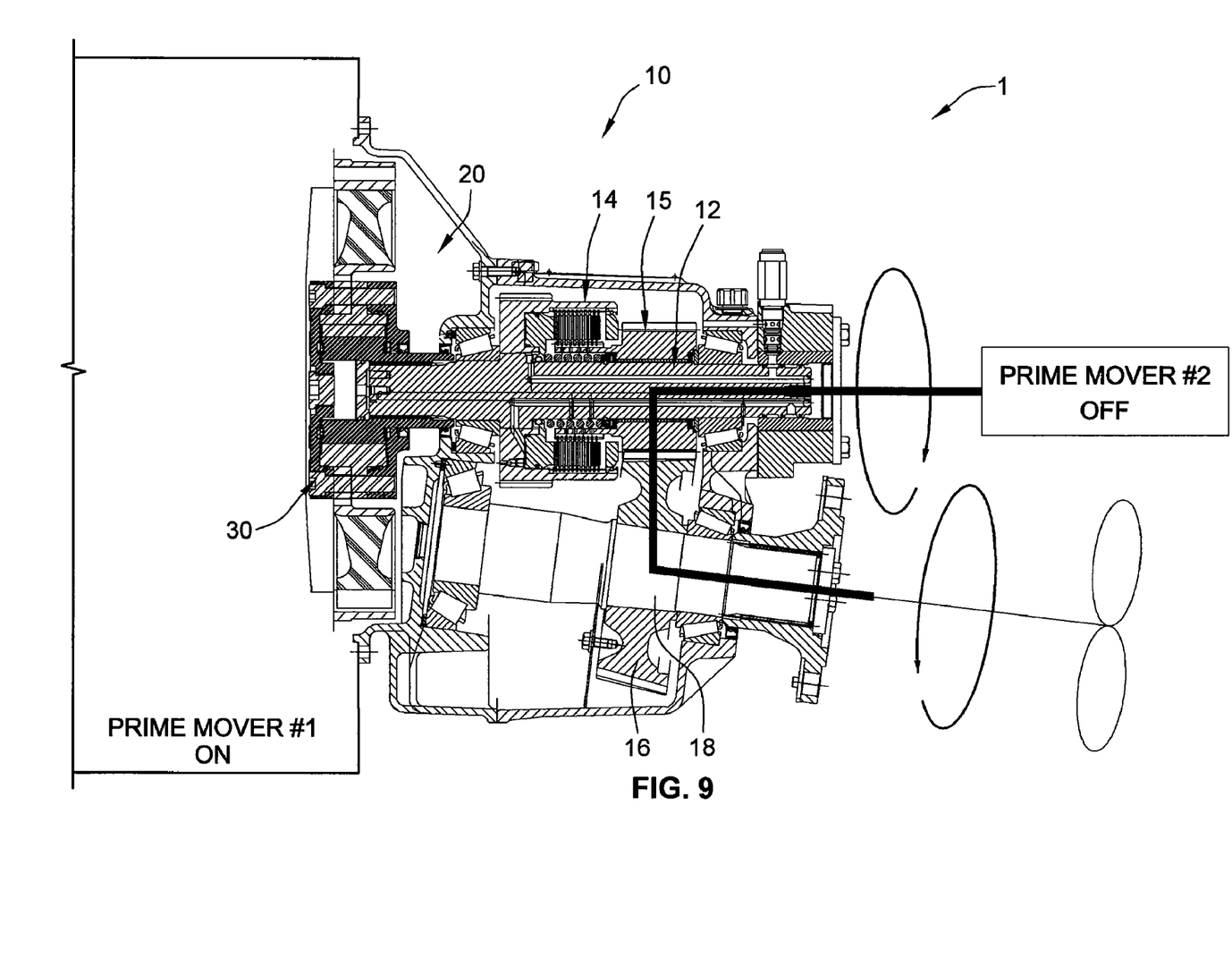
FIG. 9 is a cross-sectional top plan view of the hybrid marine power train system shown in FIG. 8 with the transmission inputting power from a second prime mover.

Referring now to FIGS. 1, 4, and 5, passive clutch implementations of PTI clutch device 22 automatically transmit power from only one of the engine 2 and motor 5 based on the torque and rotational speed directed to the clutch assembly 22 from each of the engine 2 and motor 5. Preferably, passive clutch versions of the PTI clutch device include a freewheeling or one-way device, for example an overrunning clutch 30 or bearing assembly. The overrunning clutch 30 passively allows a rotational speed differential to be created between an engine output shaft rotational speed, namely a rotational speed of engine crankshaft 3, and a rotational speed of the transmission input shaft 12. This can be accomplished by providing the overrunning clutch 30 at an interface between the engine crankshaft 3 and the transmission input shaft 12.

Referring now to FIG. 2, overrunning clutch 30 has an inner segment that is concentrically housed in and rotationally driven by an outer segment. Although the inner segment is rotationally driven by the outer segment, it can freely rotate faster than the outer segment. This allows the inner segment to "freewheel" or "overrun" with respect to the outer segment. The outer segment of the overrunning clutch is connected to, directly or indirectly, and driven by the engine crankshaft 3. The inner segment of the overrunning clutch is connected to and rotates in unison with the transmission input shaft 12.

In such configuration, the transmission input shaft 12 must rotate at least as fast as the engine crankshaft 3, although it can rotate faster then the crankshaft 3. This allows the engine 2 to power or drive the transmission 10 when there is no other input force (e.g., from prime mover) trying to rotate the transmission input shaft 12 at a relatively greater rotational speed. Furthermore, since the inner segment of the overrunning clutch 30 can overrun the outer segment, the engine 2 can be turned off, whereby its crankshaft 3 rotational speed is zero RPM, and the transmission input shaft 12 can be rotated at an end that is opposite the overrunning clutch 30 by motor 5. In other words, the transmission input shaft 12 can be driven from either end, by the engine 2 or motor 5, respectively.

Referring now to FIGS. 1, 6, 7, 8, and 9, in other passive clutch implementations, overrunning clutch 30 is still provided at an interface between engine crankshaft 30 and transmission input shaft 12, but motor 5 transmits power to the transmission 10 in a different manner. For example, in some embodiments, motor 5 does not transmit power directly to an end of transmission input shaft 12. Instead, motor 5 rotates auxiliary shaft 52 which transmits power through drive gear 55 and clutch assembly 14, and then ultimately to transmission input shaft 12.

3. Active Clutch Implementations

With reference now to all of the drawings, active clutch implementations of PTI clutch device 22 can be actively switched or actuated, by biasing components thereof, to change which of the prime movers, namely which of engine 2 and motor 5, provides the driving force for transmission 10 at any given time. Such active clutch implementations include a master clutch assembly in place of the overrunning clutch 30. The master clutch assembly is preferably hydraulically actuated and can include either a wet clutch or dry clutch configuration, based on the desired end use configuration of the PTI clutch device 22.

Regarding wet clutch versions of active clutch implementations, the PTI clutch device 22 can include a master clutch assembly with a clutch basket that is driven by crankshaft 3 or a flywheel of engine 2. The clutch basket houses a clutch pack or stack having multiple, alternately arranged, clutch and friction discs that are at least partially submerged in an oil bath. When the master clutch assembly is engaged, the clutch stack is axially squeezed together, whereby the engine 2 is mechanically coupled to the transmission input shaft 12. When the master clutch assembly is disengaged, the clutch and friction discs slip with respect to each other, uncoupling the engine 2 from the transmission input shaft 12. This allows another prime mover, e.g., motor 5, to drive or power the transmission 10. For example, the motor 5 can rotate an end of the transmission input shaft 12 that is opposite the PTI clutch device 22, or it can drive a separate and distinct auxiliary shaft 52.

Regarding dry clutch versions of active clutch implementations, the PTI clutch device 22 can be the same as that described above with respect to wet clutch versions, only including clutch and friction discs that are configured to run outside of an oil bath or in a dry condition. Or, the PTI clutch device 22 can include a single pressure plate that selectively engages a flywheel or crankshaft 3 of the engine 2. Similar to the above-described wet clutch implementations, the dry clutch master clutch assembly can be engaged to power the transmission 10 with the engine 2, or disengaged to power the transmission 10 with the motor 5.

Yet other arrangements can be included, depending on the particular desired end use configuration of the transmission. It is noted that engine 2 and motor 5 can be coupled to transmission 10 in any of a variety of ways. Regardless of which particular components of transmission 10 that engine 2 and motor 5 interface with, directly or indirectly, the overall hybrid marine power train system 1 is configured to allow a user to select which ones of multiple prime movers provides motive force to the boat, for instance, by rotating its prop or driving another propulsion device, at any given time.

Regardless, it is noted that many changes and modifications may be made to the present invention without departing from the spirit thereof. The scope of some of these changes is discussed above. The scope of others will become apparent from the appended claims.

I claim:

1. A transmission for use in a hybrid marine power train system, comprising:
   a transmission housing for enclosing transmission components separate from other components of the hybrid marine power train system;
   an input shaft mounted at least partially within the housing and accepting power from a first prime mover;
   a clutch assembly mounted at least partially within the transmission housing and having an input portion and an output portion thereof, the input portion of the clutch assembly being connected to and receiving power from the input shaft and the output portion of the clutch assembly selectively receiving power from the input portion of the clutch assembly;
   a main shaft connected to and receiving power from (i) the output portion of the clutch assembly, and (ii) a second prime mover; and
   an output shaft operably connected to the main shaft by way of multiple gears that engage each other and are arranged between the main and output shafts so that the output shaft transmits power from at least one of the first and second prime movers to a propeller of a marine vessel.

2. The transmission of claim 1, further comprising an overrunning clutch connecting the input shaft to the first prime mover.

3. The transmission of claim 2, wherein the main shaft defines first and second ends, the first end of the main shaft being connected to the output portion of the clutch assembly and the second end of the main shaft being connected to the second prime mover.

4. A transmission for use in a hybrid marine power train system, comprising:
   a housing;
   an input shaft mounted at least partially within the housing and accepting power from a first prime mover;
   an overrunning clutch connecting the input shaft to the first prime mover;
   a clutch assembly mounted at least partially within the housing and having an input portion and an output portion thereof, the input portion of the clutch assembly being connected to and receiving power from the input shaft and the output portion of the clutch assembly selectively receiving power from the input portion of the clutch assembly;
   a main shaft connected to and receiving power from (i) the output portion of the clutch assembly, and (ii) a second prime mover;
   an output shaft operably connected to the main shaft and transmitting power from at least one of the first and second prime movers to a propeller of a marine vessel,
   wherein the main shaft defines first and second ends, the first end of the main shaft being connected to the output portion of the clutch assembly and the second end of the main shaft being connected to the second prime mover; and
   wherein the input shaft is accessible through a first sidewall of the housing and the second end of the main shaft is accessible through a second, opposing, sidewall of the housing.

5. The transmission of claim 2, wherein the first and second prime movers define rotational axes thereof, the rotational axes of the first and second prime movers being aligned with each other.

6. A transmission for use in a hybrid marine power train system, comprising:
   a transmission housing for enclosing transmission components separate from other components of the hybrid marine power train system;
   a first input shaft mounted at least partially within the transmission housing and accepting power from a first prime mover;
   a second input shaft extending parallel to the first input shaft and accepting power from a second prime mover;
   a clutch assembly mounted at least partially within the housing and having an input portion and an output portion thereof, the input portion of the clutch assembly being connected to and receiving power from (i) the first input shaft, and (ii) the second input shaft;
   a main shaft connected to and receiving power from the output portion of the clutch assembly; and
   an output shaft operably connected to the main shaft by way of multiple gears that engage each other and are arranged between the main and output shafts so that the output shaft transmits power from at least one of the first and second prime movers to a propeller of a marine vessel.

7. The transmission of claim 6, further comprising an overrunning clutch connecting the input shaft to the first prime mover.

8. The transmission of claim 7, wherein the second prime mover drives a clutch basket of the input portion of the clutch assembly.

9. A hybrid marine power train system, comprising:
a first prime mover;
a transmission having,
an input shaft;
an overrunning clutch having first and second rotatable segments, the first rotatable segment of the overrunning clutch being connected to the input shaft of the transmission and the second rotatable segment of the overrunning clutch being connected to an output shaft of the first prime mover;
a main shaft connected to and driven by the input shaft such that the input and main shafts, at least at times, rotate in unison with each other;
a clutch assembly selectively connecting the input and main shafts of the transmission to each other;
an output shaft connected to and driven by the main shaft;
a second prime mover operably coupled to and selectively driving the main shaft of the transmission; and
wherein when the second prime mover drives the main shaft of the transmission, the first segment of the overrunning clutch rotates faster than the second segment of the overrunning clutch, allowing the input shaft of the transmission to rotate faster than the output shaft of the first prime mover.

10. The hybrid marine power train system of claim 9, further comprising a second input shaft accepting power from the second prime mover, the second input shaft being operably coupled to the main shaft of the transmission.

11. The hybrid marine power train system of claim 9, wherein the second prime mover is directly connected to the main shaft of the transmission.

12. The hybrid marine power train system of claim 9, wherein the second prime mover includes an electric motor.

13. The hybrid marine power train system of claim 12, wherein the second prime mover includes an electric generator.

14. The hybrid marine power train system of claim 10, wherein an output shaft of the second prime mover is aligned with and connected to the second input shaft of the transmission.

15. The hybrid marine power train system of claim 12, wherein when an output shaft of the second prime mover rotates faster than an output shaft of the first prime mover, the main shaft of the transmission is driven by the second prime mover.

16. The hybrid marine power train system of claim 9, wherein the first prime mover is an internal combustion engine and the output shaft is a crankshaft of the internal combustion engine.

17. The hybrid marine power train system of claim 9, wherein the clutch assembly and the overrunning clutch are provided at opposing ends of the input shaft of the transmission.

18. The hybrid marine power train system of claim 17, wherein the clutch assembly is continuously modulatable.

19. The hybrid marine power train system of claim 9, wherein a power flow path originating from the first prime mover can flow through the transmission input shaft to each of the second prime mover and the transmission output shaft.

20. A hybrid marine power train system, comprising:
a first prime mover connected to a transmission that includes an output shaft and being provided in a marine vessel such that outermost lateral perimeter surfaces of the first prime mover and transmission define an overall power train width within an engine compartment of a marine vessel, and wherein longitudinally projecting the overall power train width toward a transom of the marine vessel defines a powertrain occupied space of the engine compartment of the marine vessel; and
a second prime mover attached to the transmission, second prime mover being spaced from the output shaft of the transmission and housed within the powertrain occupied space of the engine compartment of the marine vessel.

21. The hybrid marine power train system of claim 20, further comprising an overrunning clutch connecting an input shaft of the transmission to the first prime mover.

22. The hybrid marine power train system of claim 20, wherein the second prime mover drives a clutch basket of a clutch assembly of the transmission.

* * * * *